US012712411B2

(12) United States Patent
Yamada et al.

(10) Patent No.: US 12,712,411 B2
(45) Date of Patent: Aug. 18, 2026

(54) ELECTRONIC CONTROL DEVICE WITH CONNECTOR HEAD ARRANGEMENT FOR ELECTRIC MOTOR

(71) Applicant: Hitachi Astemo, Ltd., Hitachinaka (JP)

(72) Inventors: Narutoshi Yamada, Hitachinaka (JP); Takuro Kanazawa, Hitachinaka (JP); Kazuhiko Nakano, Hitachinaka (JP); Hideyuki Hara, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 283 days.

(21) Appl. No.: 18/043,461

(22) PCT Filed: Jun. 28, 2021

(86) PCT No.: PCT/JP2021/024272

§ 371 (c)(1),
(2) Date: Feb. 28, 2023

(87) PCT Pub. No.: WO2022/097325

PCT Pub. Date: May 12, 2022

(65) Prior Publication Data

US 2024/0030776 A1 Jan. 25, 2024

(30) Foreign Application Priority Data

Nov. 6, 2020 (JP) ................................. 2020-185491

(51) Int. Cl.
*H02K 5/22* (2006.01)
*H02K 11/30* (2016.01)

(52) U.S. Cl.
CPC ............. *H02K 5/225* (2013.01); *H02K 11/30* (2016.01)

(58) Field of Classification Search
CPC .......... H02K 5/22; H02K 5/225; H02K 11/30; H02K 11/33; B62D 4/0406
See application file for complete search history.

(56) References Cited

U.S. PATENT DOCUMENTS

2012/0161590 A1* 6/2012 Yamasaki .............. H02K 11/33 310/68 B
2017/0217481 A1 8/2017 Asao et al.
(Continued)

FOREIGN PATENT DOCUMENTS

JP 2017192231 A * 10/2017
JP 6223593 B2 11/2017
(Continued)

OTHER PUBLICATIONS

Togawa, Machine Translation of JP2020145856, Sep. 2020 (Year: 2020).*

(Continued)

*Primary Examiner* — Eric Johnson
(74) *Attorney, Agent, or Firm* — FOLEY & LARDNER LLP

(57) ABSTRACT

One first connector head 21A and one second connector head 22A face each other, in the plane view of a connector terminal assembly 19, with the axial line of an output shaft 12, which is the axial line of the motor rotation shaft of an electric motor, therebetween without being offset from each other. The other first connector head 21B and the other second connector head 22B face each other, in the plane view of the connector terminal assembly 19, with the axial line of the output shaft 12, which is the axial line of the motor rotation shaft of the electric motor, therebetween without being offset from each other.

12 Claims, 20 Drawing Sheets

(56) References Cited

U.S. PATENT DOCUMENTS

| | | | | |
|---|---|---|---|---|
| 2019/0016371 | A1 | 1/2019 | Urimoto et al. | |
| 2019/0312491 | A1* | 10/2019 | Yamamoto | H02K 11/0094 |
| 2020/0220423 | A1* | 7/2020 | Nishikawa | H02K 11/40 |
| 2021/0111659 | A1* | 4/2021 | Akutsu | B62D 5/0403 |
| 2021/0221426 | A1 | 7/2021 | Kanno et al. | |
| 2021/0261187 | A1 | 8/2021 | Ishii et al. | |
| 2021/0339794 | A1* | 11/2021 | Kawaguchi | H02K 5/225 |

FOREIGN PATENT DOCUMENTS

| | | | | |
|---|---|---|---|---|
| JP | 2020-005474 A | | 1/2020 | |
| JP | 2020145856 A | * | 9/2020 | |
| WO | WO-2017/175325 A1 | | 10/2017 | |
| WO | WO-2018025378 A1 | * | 2/2018 | H02K 5/22 |
| WO | WO-2018/225123 A1 | | 12/2018 | |
| WO | WO-2019/235077 A1 | | 12/2019 | |
| WO | WO-2022070935 A1 | * | 4/2022 | H02P 5/00 |

OTHER PUBLICATIONS

Saito, Machine Translation of WO2022070935, Apr. 2022.*
Akutsu, Machine Translation of JP2017192231, Oct. 2017.*
Notice of Reasons for Refusal dated Dec. 19, 2023 issued in JP Application No. 2022-560641, with English translation, 8 pages.
International Search Report dated Sep. 14, 2021 issued in International Application No. PCT/JP2021/024272, with English translation, 5 pages.
Written Opinion of the International Searching Authority dated Sep. 14, 2021 issued in International Application No. PCT/JP2021/024272, with English translation, 12 pages.

* cited by examiner

FIG. 3

FIG. 14
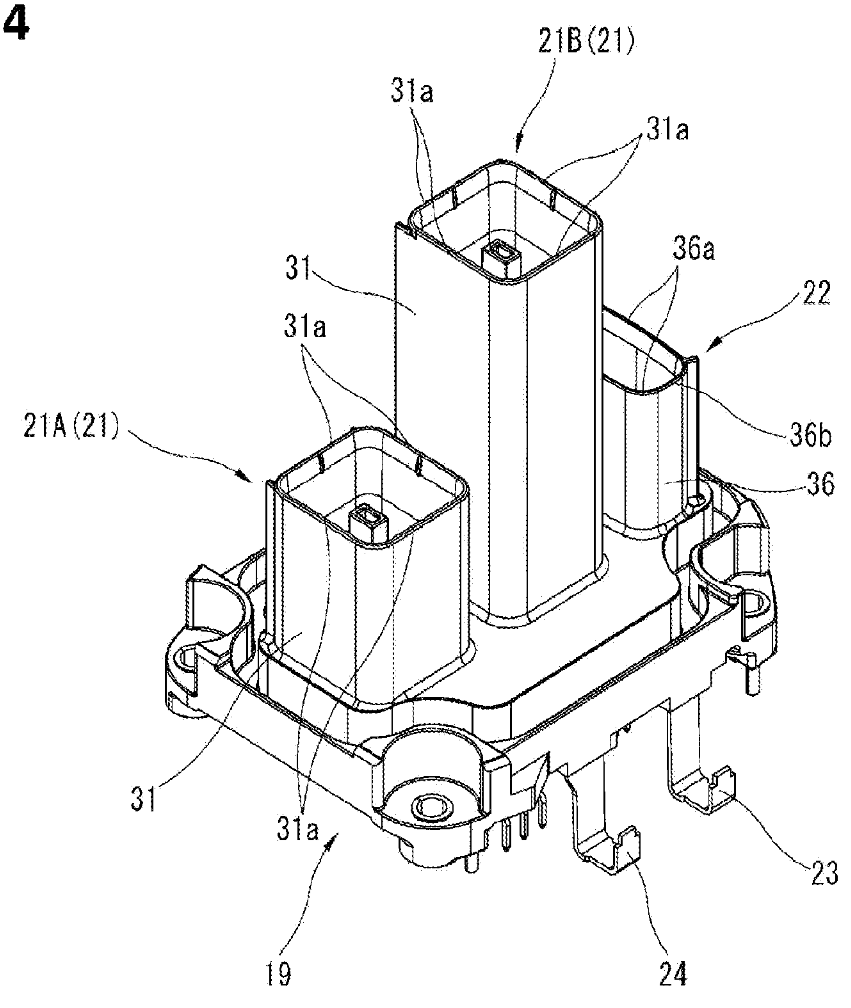

ELECTRONIC CONTROL DEVICE WITH CONNECTOR HEAD ARRANGEMENT FOR ELECTRIC MOTOR

TECHNICAL FIELD

The present invention relates to an electric motor drive control device.

BACKGROUND TECHNOLOGY

For example, in a patent document 1, an electric power steering apparatus has been disclosed which is provided with a motor and a control unit integrally attached to the motor and including a plurality of connectors for input and output.

In the patent document 1, the plurality of the connectors are provided on the upper surface of a housing of the control unit.

However, in the electric power steering apparatus disclosed in the patent document 1, those connectors are arranged along the outer periphery of the upper surface of the housing so as to surround filters arranged in the middle of the upper surface of the housing.

That is, in the patent document 1, the plurality of the connectors provided on the upper surface of the housing are simply arranged along the outer periphery of the upper surface of the housing, and there is therefore room for improvement in decreasing of the size of the device by reducing clearances between the plurality of the connectors.

PRIOR ART REFERENCE

Patent Document

Patent Document 1: Japanese Patent No. 6223593

SUMMARY OF THE INVENTION

According to the present invention, in one aspect thereof, an electric motor drive control device includes: an electric motor having a plurality of independent windings; an electronic control unit configured to control driving of the electric motor; a plurality of first connector heads to which external terminals are attached; and at least one second connector head which has a function different from those of the first connector heads, and to which an external terminal is attached, wherein one of the first connector heads forms a pair of connector heads with another first connector head or with the second connector head, the pair of the connector heads facing each other with an axial line of a motor rotation shaft of the electric motor therebetween, and wherein one of the first connector heads or the second connector head positioned between the pair of the connector heads is arranged so as to face the pair of the connector heads.

According to the present invention, the distance between the connector heads can be reduced, thereby reducing the size of the electric motor drive control device.

BRIEF DESCRIPTION OF THE DRAWINGS

FIG. 3 is a plane view of a connector terminal assembly of a first embodiment.

FIG. 14 is a perspective view of the connector terminal assembly of the second embodiment.

MODE FOR IMPLEMENTING THE INVENTION

Figure 1:
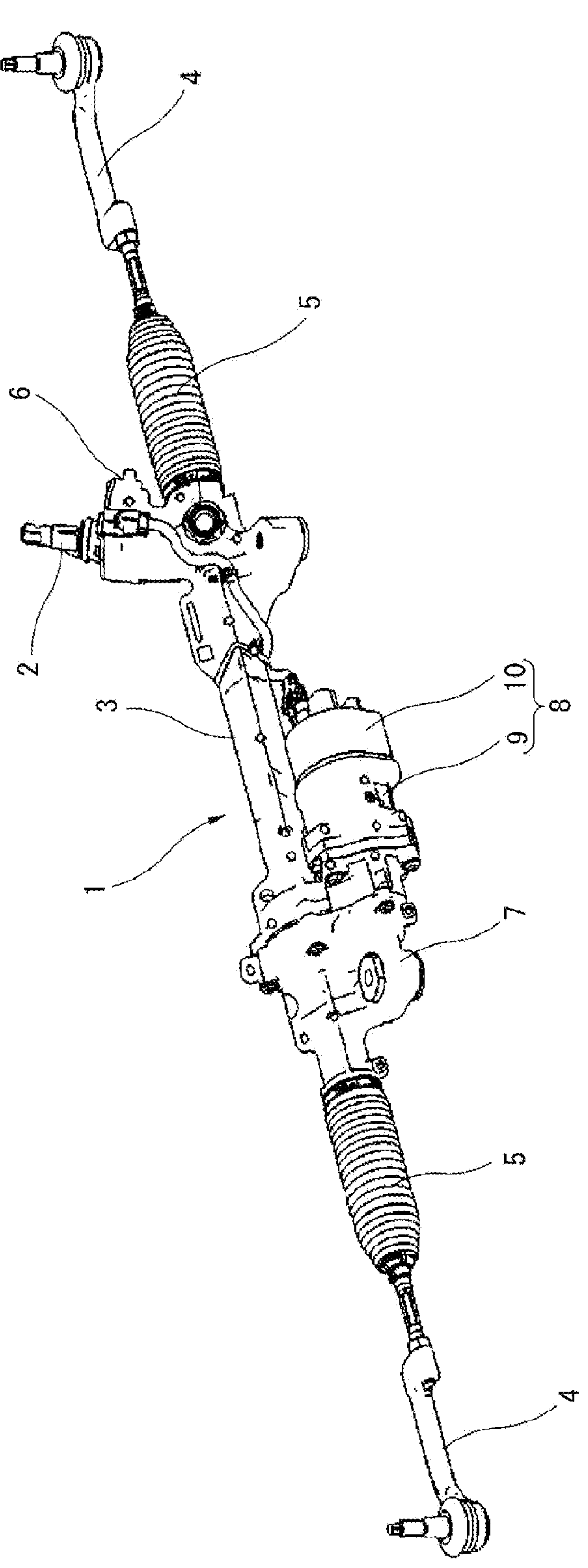
FIG. 1 is a perspective view of a whole steering apparatus to which an electric motor drive control device of the present invention is applied.

In the following, one embodiment of the present invention will be explained in detail based on the drawings. FIG. 1 is a perspective view of a whole steering apparatus 1 to which an electric motor drive control device of the present invention is applied.

The steering apparatus 1 is one for steering front wheels of a vehicle such as an automobile, and is connected to the lower end of a steering shaft 2 connected to a steering wheel (not shown).

The steering apparatus 1 includes a rack (not shown) which meshes with a pinion (not shown) provided at the lower end of the steering shaft 2. The rack has a shape which is long and narrow in the vehicle width direction (right and left direction) of a vehicle body on which the steering apparatus 1 is mounted.

The steering apparatus 1 includes a rack housing 3 which covers the rack, tie rods 4 connected to the respective both end portions of the rack, and rubber boots 5 provided between the rack housing 3 and the tie rods 4. The tie rods 4 are configured to steer the front wheels in the right and left direction.

In addition, the steering apparatus 1 includes a torque sensor 6 for detecting the rotation direction and the rotation torque of the steering shaft 2, and an electric power steering device 8 connected to the rack via a gear 7. The electric power steering device 8 is one corresponding to an electric motor drive control device.

The electric power steering device 8 is one for assisting the torque at the time of the rotation operation of the steering wheel, and includes an electric motor unit 9 and an electronic control unit 10.

The electric power steering device 8 applies a steering auxiliary force (drive operation amount) based on the detection value of the torque sensor 6 to the rack via the gear 7. Specifically, the electronic control unit 10 calculates, based on the detection value of the torque sensor 6, a steering auxiliary force (drive operation amount) which is generated by the electric motor unit 9, and controls the operation of the electric motor unit 9. The electric motor unit 9 is configured to generate the steering auxiliary force (drive operation amount) based on the detection value of the torque sensor 6. That is, the electronic control unit 10 is configured to control the driving of the electric motor unit 9.

Figure 2:
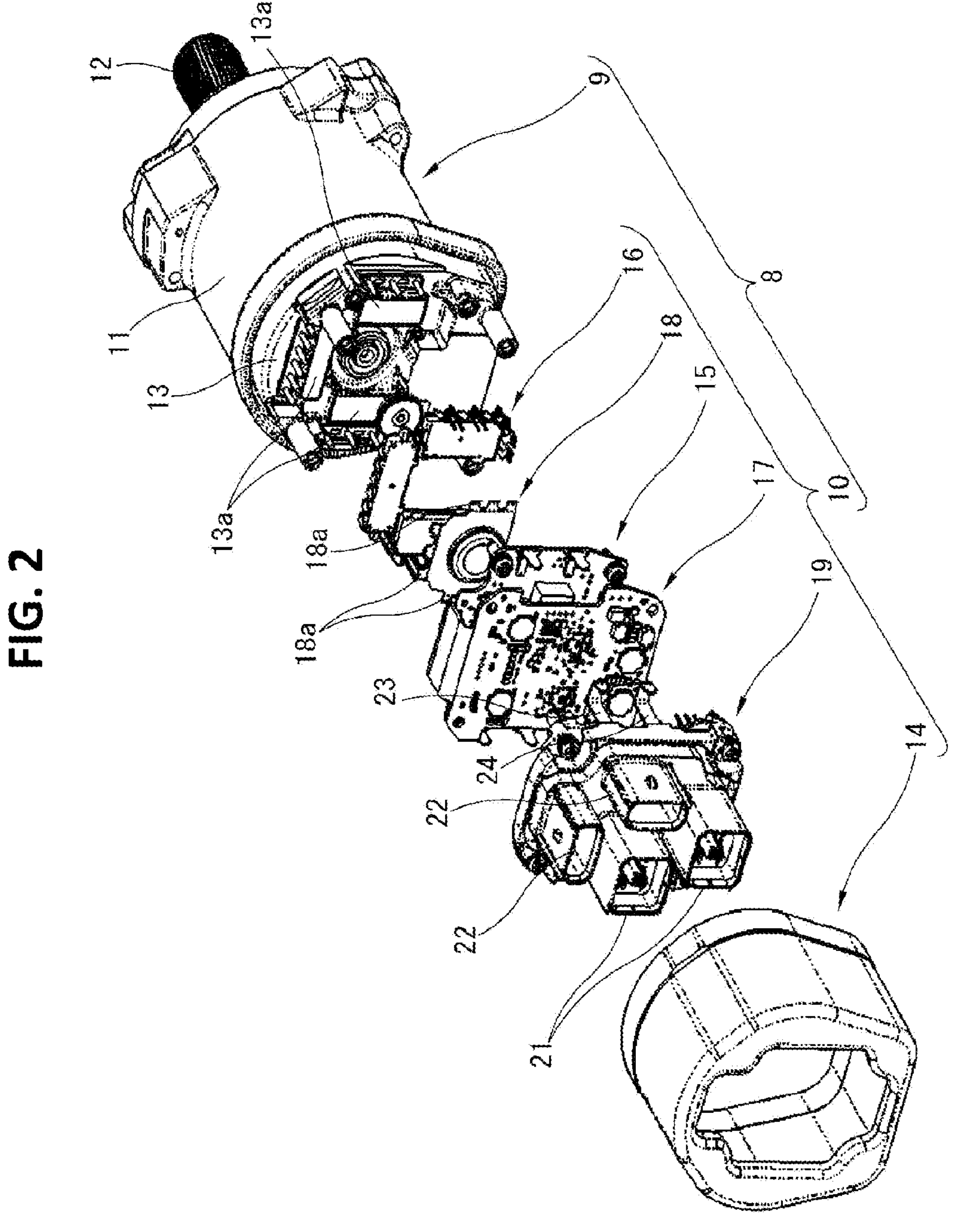
FIG. 2 is a perspective exploded view of an electric power steering apparatus.

FIG. 2 is a perspective exploded view of the electric power steering device 8.

The electric motor unit 9 includes an electric motor (not shown) having a plurality of independent windings, and a cylindrical motor housing 11 inside which the electric motor is accommodated. That is, the electric motor unit 9 includes the motor housing 11 and the electric motor. In addition, the electric motor unit 9 includes a drive control system in each of the windings of the electric motor.

The motor housing 11 is made of a metal material such as aluminum alloy. A distal end side (one end side) of an output shaft 12 of the electric motor protrudes from the motor housing 11. That is, in the electric motor unit 9, the output shaft 12 of the electric motor protrudes from one end side of the motor housing 11. The output shaft 12 of the electric motor applies the steering auxiliary force (drive operation amount) to the rack via the gear 7.

The motor housing 11 functions as a heat sink member for radiating, to the external atmosphere, the heat generated at the electric motor and the heat generated at the after-mentioned power source circuit part 15 and power conversion circuit part 16.

The electronic control unit 10 is attached to an end surface portion 13 on the other end side of the motor housing 11 from which the output shaft 12 of the electric motor does not protrude, so as to be adjacent to each other.

The end surface portion 13 is formed integrally with the motor housing 11. However, the end surface portion 13 may be formed separately from the motor housing 11, and is integrated with the motor housing 11 by a bolt or welding.

The electronic control unit 10 is disposed on the other end side of the motor housing 11. The electronic control unit 10 includes a metal cover 14 made of a metal material such as aluminum alloy.

The facing end surface of one end side of the metal cover 14 which faces the motor housing 11 is fixed to the end surface portion 13 of the motor housing 11 by an adhesive, welding or a fixing bolt.

The electronic control unit 10 includes a power source circuit part 15 for generating a required power source, a power conversion circuit part 16 having a power switching element for driving and controlling the electric motor of the electric motor unit 9 which is formed, for example, by MOSFET or IGBT, a control circuit part 17 for controlling the power switching element of the power conversion circuit part 16, a lid member 18 which pushes (energizes) the power conversion circuit part 16 toward the end surface portion 13 side of the motor housing 11, and a connector terminal assembly 19 as a connector head member.

The power source circuit part 15, the power conversion circuit part 16, the control circuit part 17, the lid member 18 and the connector terminal assembly 19 are accommodated inside the metal cover 14. That is, the electronic control unit 10 includes the control circuit part 17, the power source circuit part 15, the power conversion circuit part 16, the lid member 18, the connector terminal assembly 19 and the metal cover 14.

In the electronic control unit 10, the power conversion circuit part 16, the lid member 18, the power source circuit part 15, the control circuit part 17 and the connector terminal assembly 19 are arranged in this order from the end surface portion 13 side of the motor housing 11 in the direction away from the end surface portion 13.

The control circuit part 17 generates a control signal for driving the switching element of the power conversion circuit part 16, and is composed, for example, of a micro-computer and a peripheral circuit. The control circuit part 17 calculates steering auxiliary force (drive operation amount) of the electric motor based on the detection value of the torque sensor 6.

The power source circuit part 15 generates power for driving the control circuit part 17 and power for the power conversion circuit part 16, and is composed, for example, of a capacitor, a coil and a switching element.

The power conversion circuit part 16 is one for adjusting electric power which flows to a coil of the electric motor, and is composed of a switching element and the like which form, for example, a three-phase switching element having upper and lower arms. The power conversion circuit part 16 is configured to drive the electric motor with a power switching element, based on the steering auxiliary force (drive operation amount) calculated by the control circuit part 17. The rotation of the output shaft 12 of the electric motor is transmitted from the pinion, which is not shown, to the rack via the gear 7, and the vehicle is steered.

The lid member 18 is positioned between the power conversion circuit part 16 and the power source circuit part 15, and is attached to the end surface portion 13 of the motor housing 11. The lid member 18 is provided with, at the outer periphery thereof, a peripheral portion **18*a* having an elastic function. The lid member 18 pushes the power conversion circuit part 16 toward a heat radiation portion 13*a* formed on the end surface portion 13 of the motor housing 11, so as to push and hold the power conversion circuit part 16 to the heat radiation portion 13*a***.

The metal cover 14 accommodates the power conversion circuit part 16, the lid member 18, the power source circuit part 15 and the control circuit part 17, and has a function for water-tightly sealing them. The metal cover 14 is adhered and fixed to the motor housing 11 with, for example, a liquid gasket. This liquid gasket is a substance having fluidity at room temperature in general, and when the liquid gasket is applied to a bonded surface, it dries or becomes uniform after the lapse of a predetermined time, so as to form an elastic coating film or a film having adhesiveness. Accordingly, the bonded part formed with the liquid gasket has a function for keeping liquid-tightness and a pressure proof function. In addition, since the metal cover 14 is made of metal, it also has a function for radiating, to the outside, heat generated at the power conversion circuit part 16, the power source circuit part 15 and the like.

The connector terminal assembly 19 is positioned between the control circuit part 17 and the metal cover 14. The connector terminal assembly 19 is connected to a vehicle battery (power source) for supplying electric power, and is also connected so as to be able to send the current control state of the electric power steering device 8 to another external control device which is not shown. The connector terminal assembly 19 is connected to the power conversion circuit part 16, the power source circuit part 15 and the control circuit part 17.

The connector terminal assembly 19 is fixed to an end surface of the metal cover 14 by a fixing bolt. The connector terminal assembly 19 includes two first connector heads 21, two second connector heads 22, an electrode terminal 23 of positive electrode and an electrode terminal 24 of negative electrode. Each of the first connector heads 21 and the second connector heads 22 is attached with the after-mentioned external terminal 33. The electrode terminals 23 and 24 are electrically connected, for example, to the power source circuit part 15.

Figure 3:
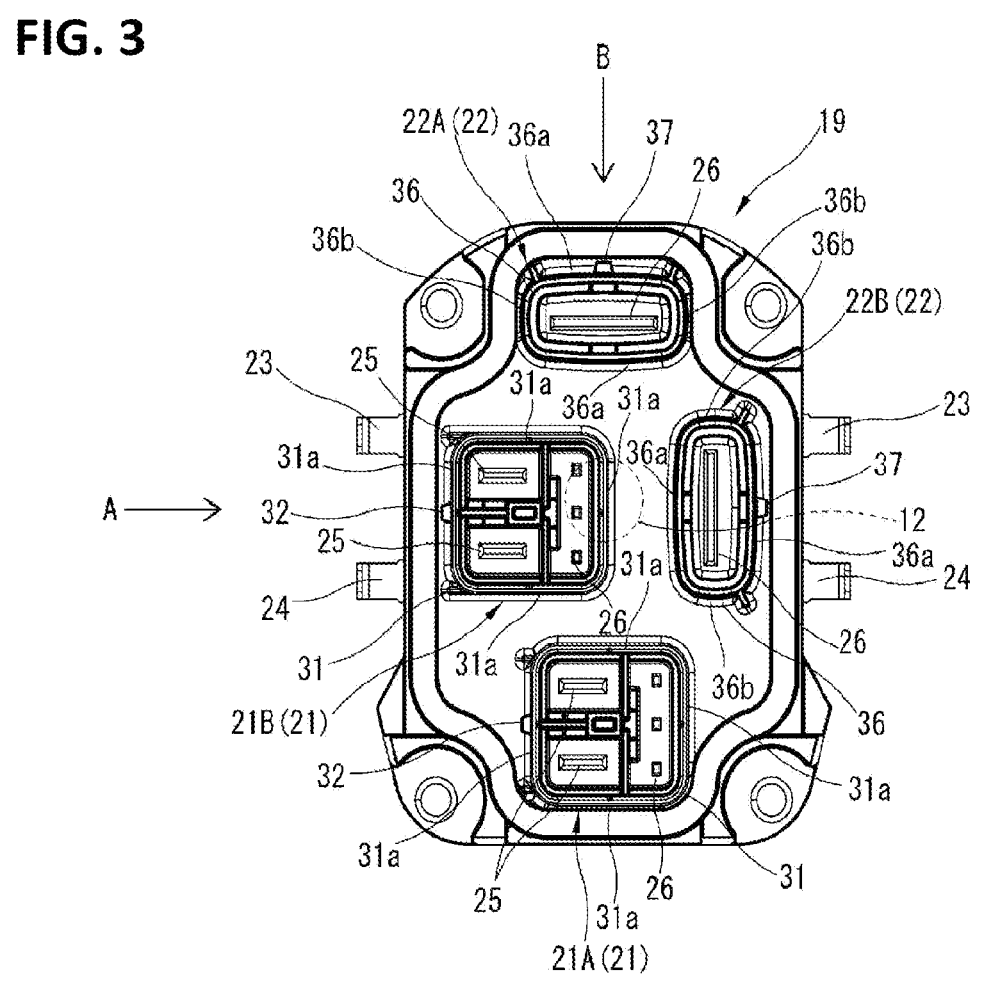
Figure 4:
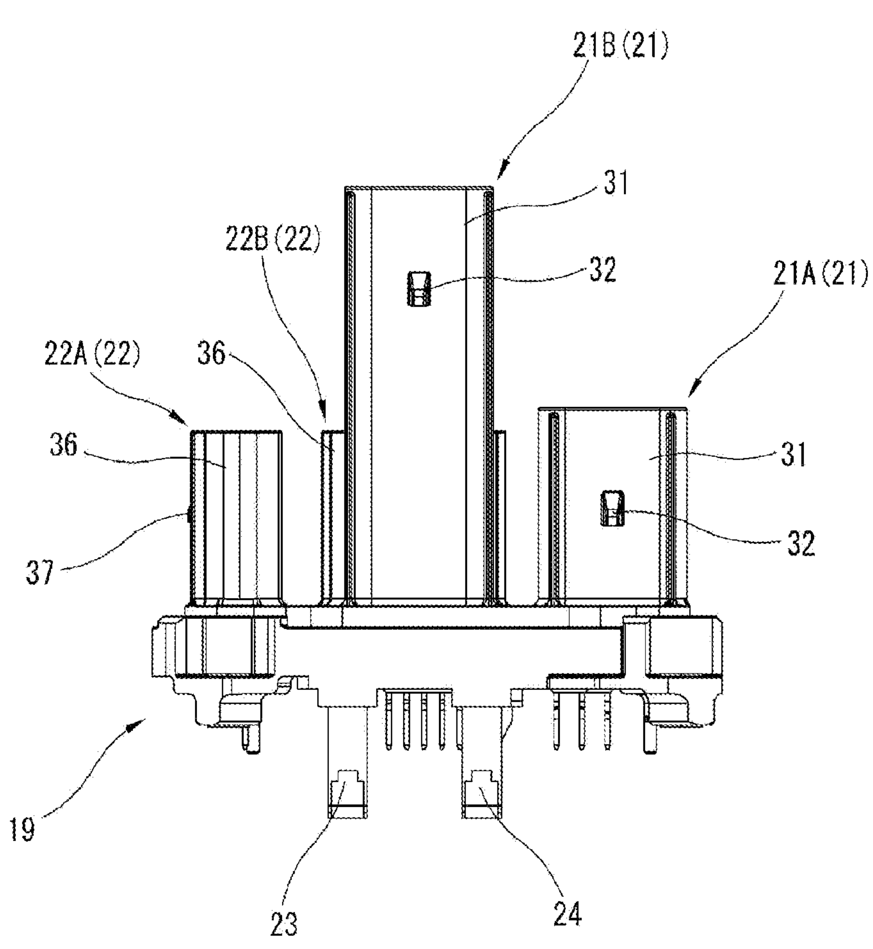
FIG. 4 is a front view of the connector terminal assembly of the first embodiment.
Figure 5:
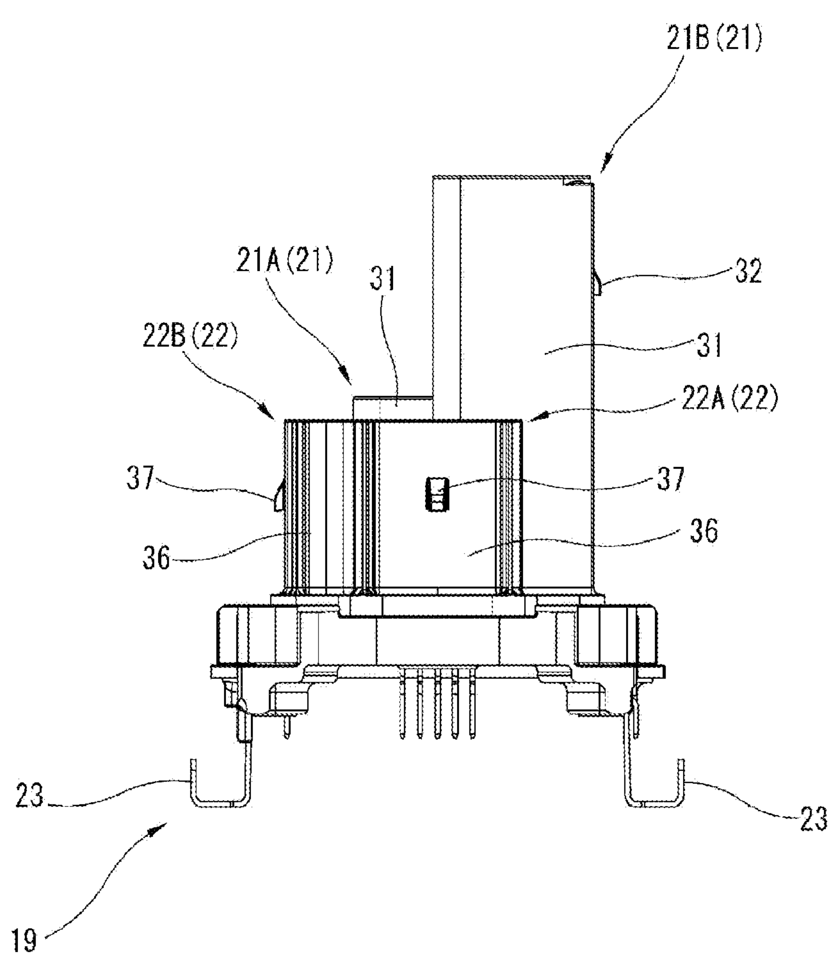
FIG. 5 is a side view of the connector terminal assembly of the first embodiment.
Figure 6:
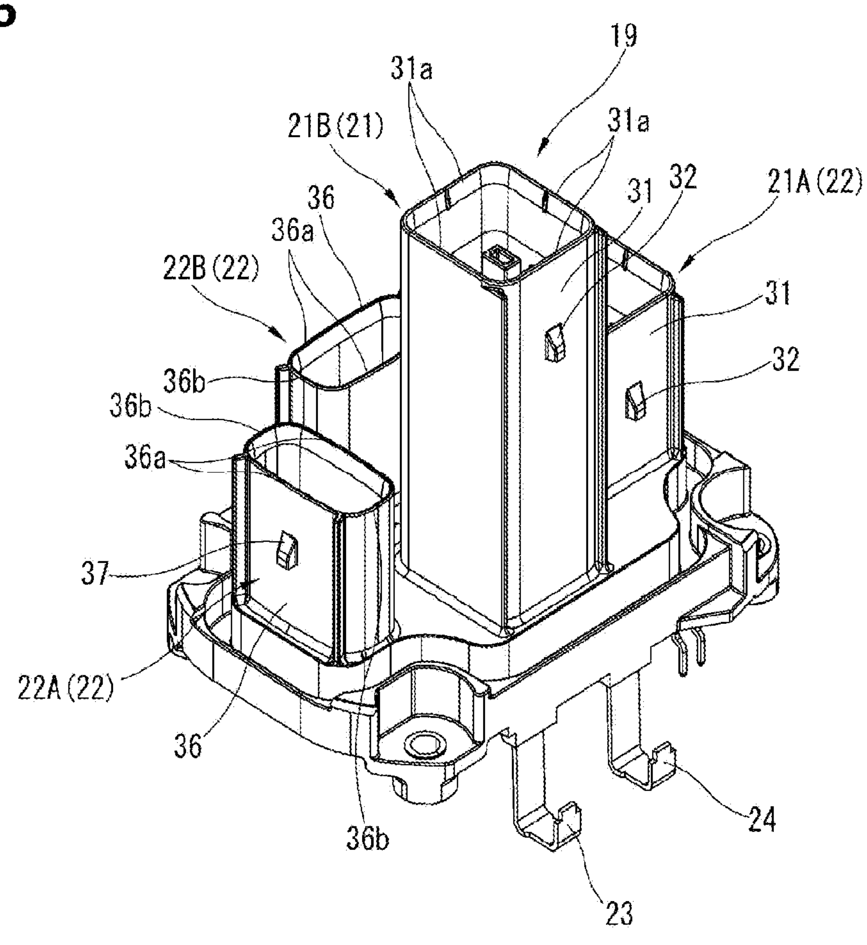
FIG. 6 is a perspective view of the connector terminal assembly of the first embodiment.
Figure 7:
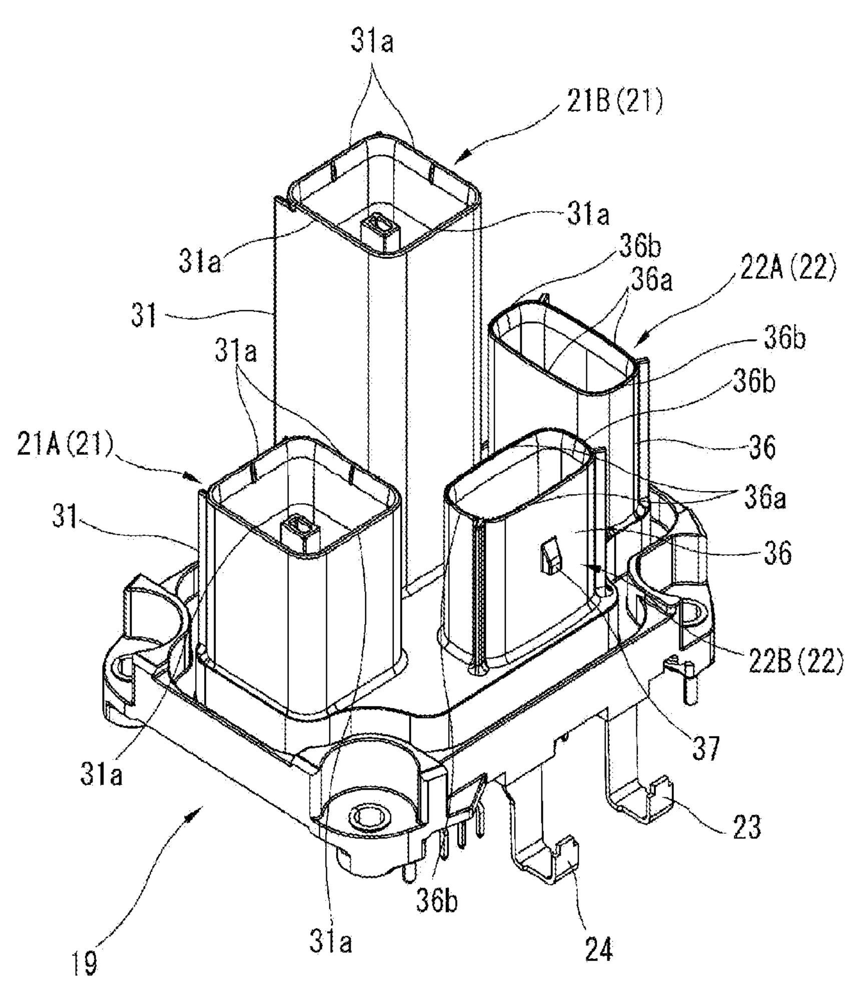
FIG. 7 is a perspective view of the connector terminal assembly of the first embodiment.
Figure 8:
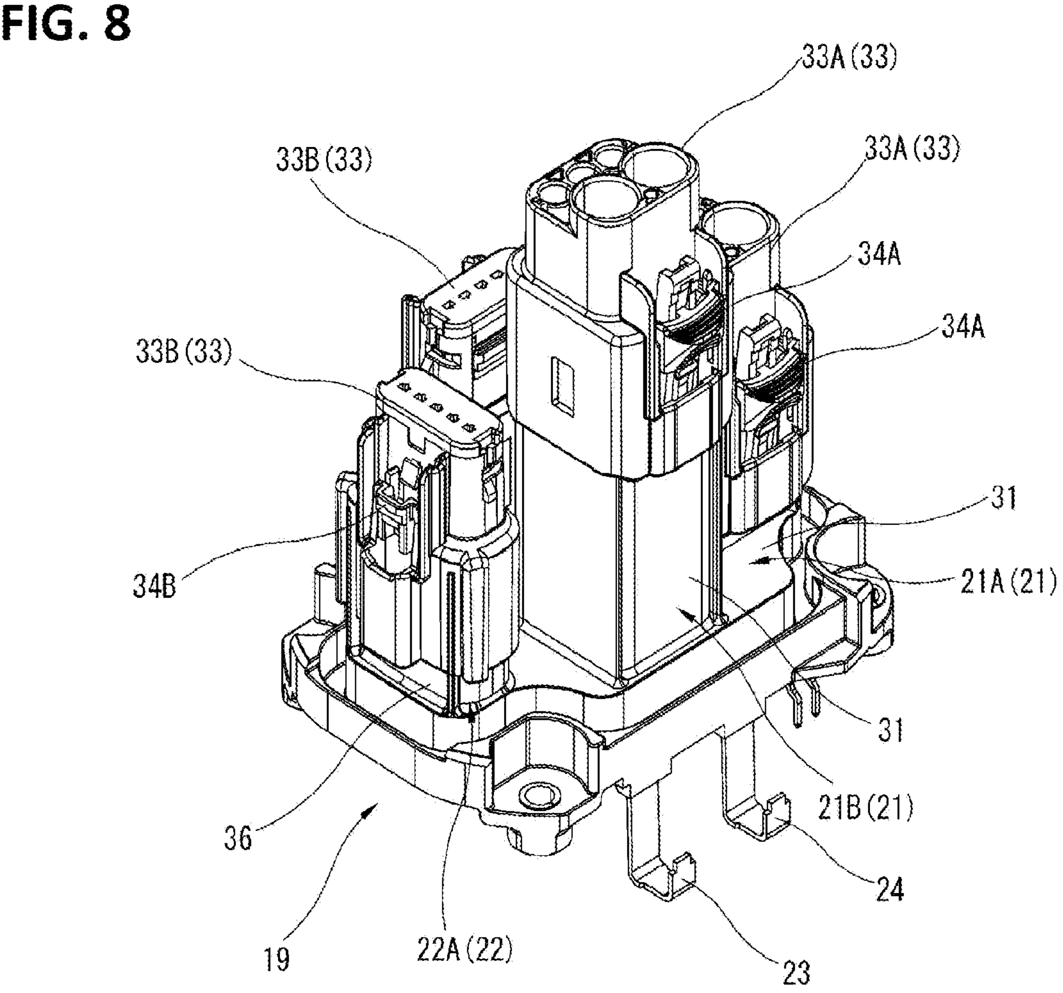
FIG. 8 is a perspective view of the connector terminal assembly of the first embodiment to which external terminals are attached.
Figure 9:
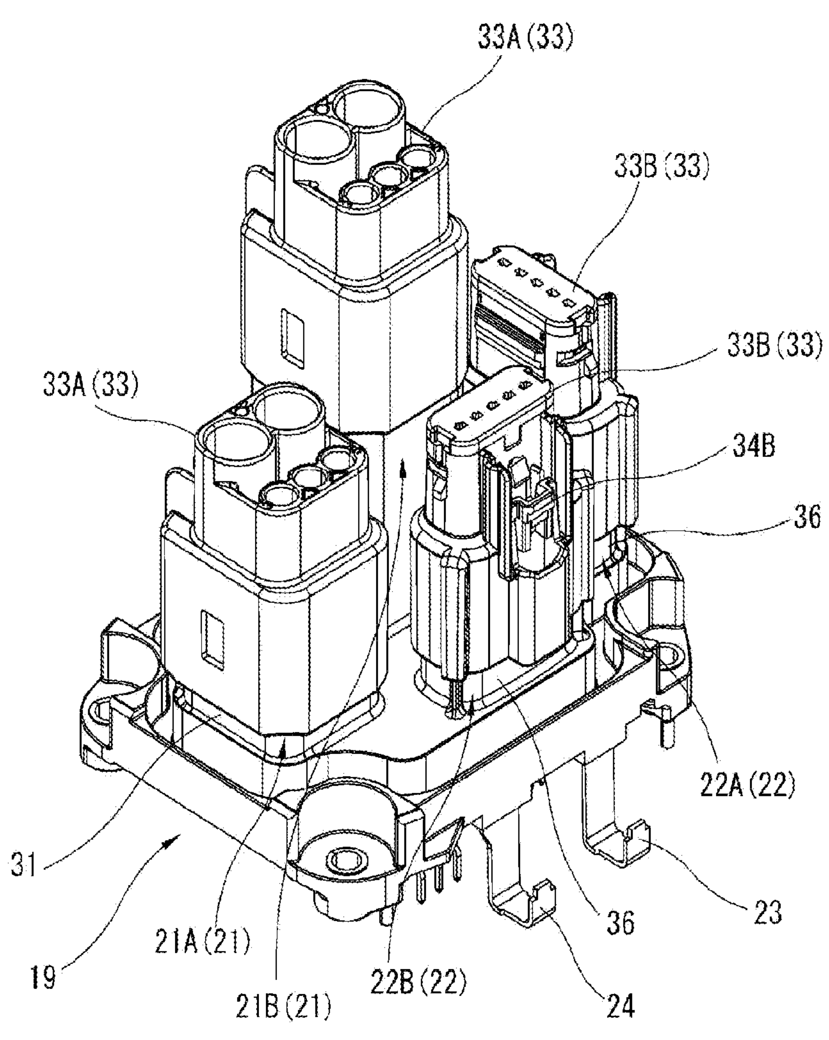
FIG. 9 is a perspective view of the connector terminal assembly of the first embodiment to which external terminals are attached.

The connector terminal assembly 19 in the first embodiment will be explained in detail by referencing FIG. 3 to FIG. 9. FIG. 3 is a plane view of the connector terminal assembly 19 in the first embodiment. FIG. 4 is a front view of the connector terminal assembly 19 in the first embodiment, and there is shown the connector terminal assembly 19 viewed in the direction shown by an arrow A of FIG. 3. FIG. 5 is a side view of the connector terminal assembly 19 in the first embodiment, and there is shown the connector terminal assembly 19 viewed in the direction shown by an arrow B of FIG. 3. FIG. 6 is a perspective view of the connector terminal assembly 19, as a single body, in the first embodiment. FIG. 7 is a perspective view of the connector terminal assembly 19, as a single body, in the first embodiment. FIG. 8 is a perspective view of the connector terminal assembly 19, as a single body, in the first embodiment, and there is shown the connector terminal assembly 19 attached with external terminals 33. FIG. 9 is a perspective view of the connector terminal assembly 19 in the first embodiment, and there is shown the connector terminal assembly 19 attached with external terminals 33.

The first connector head 21 is made of a resin material such as synthetic resin, and is capable of supplying electric power. Specifically, as shown in FIG. 3, the first connector head 21 is one in which power source terminals 25 capable of supplying electric power and signal terminals 26 for signal transmission are integrated.

As shown in FIG. 3 to FIG. 7, the first connector head 21 includes a first connector head wall 31 as a connector head wall formed so as to surround the periphery of the power source terminals 25 and the signal terminals 26, and a first coupling part 32 as a coupling part which restricts the separation from the after-mentioned external terminal 33.

The first connector head 21 is formed to have a substantially square outer shape, in the plane view of the connector terminal assembly 19. The first connector head wall 31 has four side portions 31*a*.

The first coupling part 32 is a projection which has a substantially rectangular outer shape, and protrudes from the outer peripheral surface of one of the side portions 31*a* of the first connector head wall 31. Specifically, the first coupling part 32 is provided at a part of the first connector head 21 which faces the outer peripheral edge side of the connector terminal assembly 19. In other words, the first coupling part 32 is provided at a side portion 31*a* of the first connector head wall 31 which does not face the axial line of the output shaft 12.

As shown in FIG. 8 and FIG. 9, external terminals 33 are attached to the respective first connector heads 21 and second connector heads 22. Specifically, an external terminal 33A is attached to the first connector head 21. The external terminals 33 are electrically connected to the power source terminal 25 and the signal terminal 26 of the first connector head 21.

The second connector head 22 is attached with an external terminal 33B. The external terminal 33B is electrically connected to the signal terminals 26 of the second connector head 22.

As shown in FIG. 8 and FIG. 9, the first coupling part 32 is accommodated in and held on a holding portion 34A of the external terminal 33A when the external terminal 33A is attached to the first connector head 21, and regulates the attachment position of the external terminal 33A to the first connector head 21. That is, the external terminal 33A is attached at a predetermined position of the first connector head 21 by the first coupling part 32. The holding portion 34A is provided at the distal end portion of the external terminal 33A.

In addition, the first connector head 21 may be composed of only a power source terminal 25 capable of supplying electric power.

The second connector head 22 is made of a resin material such as synthetic resin, and is one capable of inputting and outputting various signals. As shown in FIG. 3, the second connector head 22 is one including a signal terminal 26 for signal transmission. The second connector head 22 is used, for example, for input of detection signals from various sensors, and for output of a signal of the current control state of the electric power steering device 8. That is, the function of the second connector head 22 is different from that of the first connector head 21.

As shown in FIG. 3 to FIG. 7, the second connector head 22 includes a second connector head wall 36 as a connector head wall formed so as to surround the periphery of the signal terminal 26, and a second coupling part 37 as a coupling part which restricts the separation from the after-mentioned external terminal 33. The second connector head 22 is formed to have a substantially rectangular outer shape which is narrow and long along the arrangement direction of the signal terminal 26, in the plane view of the connector terminal assembly 19.

The second connector head wall 36 includes a pair of wide-width side portions 36*a* along the arrangement direction of the signal terminal 26, and a pair of narrow-width side portions 36*b* connected to the pair of the wide-width side portions 36*a*.

The second coupling part 37 is a projection which has a substantially rectangular outer shape, and protrudes from the outer peripheral surface of one of the wide-width side portions 36*a* of the second connector head wall 36. Specifically, the second coupling part 37 is provided at a part of the second connector head 22 which faces the outer peripheral edge side of the connector terminal assembly 19. In other words, the second coupling part 37 is provided at a wide-width side portion 36*a* of the second connector head wall 36 which does not face the axial line of the output shaft 12. In addition, the second coupling part 37 may be provided at a narrow-width side portion 36*b* of the second connector head wall 36 which does not face the axial line of the output shaft 12.

As shown in FIG. 8 and FIG. 9, the second coupling part 37 is accommodated in and held on a holding portion 34B of the external terminal 33B when the external terminal 33B is attached to the second connector head 22, and regulates the attachment position of the external terminal 33B to the second connector head 22. That is, the external terminal 33B is attached at a predetermined position of the second connector head 22 by the second coupling part 37. The holding portion 34B is provided at the distal end portion of the external terminal 33B.

Then, one first connector head 21A of the two first connector heads 21 and one second connector head 22A of the two second connector heads 22 face each other, in the plane view of the connector terminal assembly 19, with the axial line of the output shaft 12, which is the axial line of the motor rotation shaft of the electric motor, therebetween without being offset from each other.

In addition, the other first connector head 21B of the two first connector heads 21 and the other second connector head 22B of the two second connector heads 22 face each other, in the plane view of the connector terminal assembly 19, with the axial line of the output shaft 12, which is the axial line of the motor rotation shaft of the electric motor, therebetween without being offset from each other.

That is, the connector terminal assembly 19 includes a first connector head group which is a pair of connector heads composed of the first connector head 21A and the second connector head 22A, and a second connector head group which is a pair of connector heads composed of the first connector head 21B and the second connector head 22B.

In the plane view of the connector terminal assembly 19, the first connector head 21A is arranged (formed) so as to face one side of the first connector head 21B and a narrow-width side portion 36*b* of the second connector head 22B.

In the plane view of the connector terminal assembly 19, the second connector head 22A is arranged (formed) so as to face one side of the first connector head 21B and a narrow-width side portion 36*b* of the second connector head 22B.

That is, the connector heads of the first connector head group are arranged such that at least part of each of them faces at least one of the connector heads of the second connector head group. In other words, the connector heads of the second connector head group are arranged such that at least part of each of them faces at least one of the connector heads of the first connector head group.

With this, in the electric power steering device 8, the distance between each of the first connector heads 21 and each of the second connector heads 22 (distance between connector heads) can be reduced, and the size can be reduced.

In addition, the first connector head group may be a connector head group of the combination of only first connector heads 21A, and the second connector head group may be a connector head group of the combination of only second connector heads 22B.

In addition, as shown in FIG. 4 and FIG. 7, two first connector heads 21 adjacent to each other are formed such that the positions of the first coupling parts 32 along the axial line direction of the output shaft 12 are different from each other. In other words, two first connector heads 21 having the same function of a plurality of connector heads are formed such that the positions of the first coupling parts 32 are different from each other along the axial line direction of the output shaft 12 which is the axial line of the motor rotation shaft of the electric motor.

With this, in the electric power steering device 8, the connector heads can be arranged such that the distance between first connector heads 21 and the second connector heads 22 (distance between connector heads) is reduced without impairing workability at the time of the inserting and removing of the external terminals 33, thereby reducing the size.

In the following, another embodiment of the present invention will be explained. In addition, the same reference number designates the same component of the first embodiment mentioned above, and redundant explanation is omitted.

Although the electric power steering device 8 in a second embodiment has substantially the same configuration as that of the electric power steering device 8 in the first embodiment mentioned above, the connector terminal assembly 19 is different from that of the first embodiment.

That is, the connector terminal assembly 19 of the second embodiment includes two first connector heads 21 and one second connector head 22, and the number of the connector heads is different from that of the connector heads of the connector terminal assembly 19 of the first embodiment.

Figure 10:
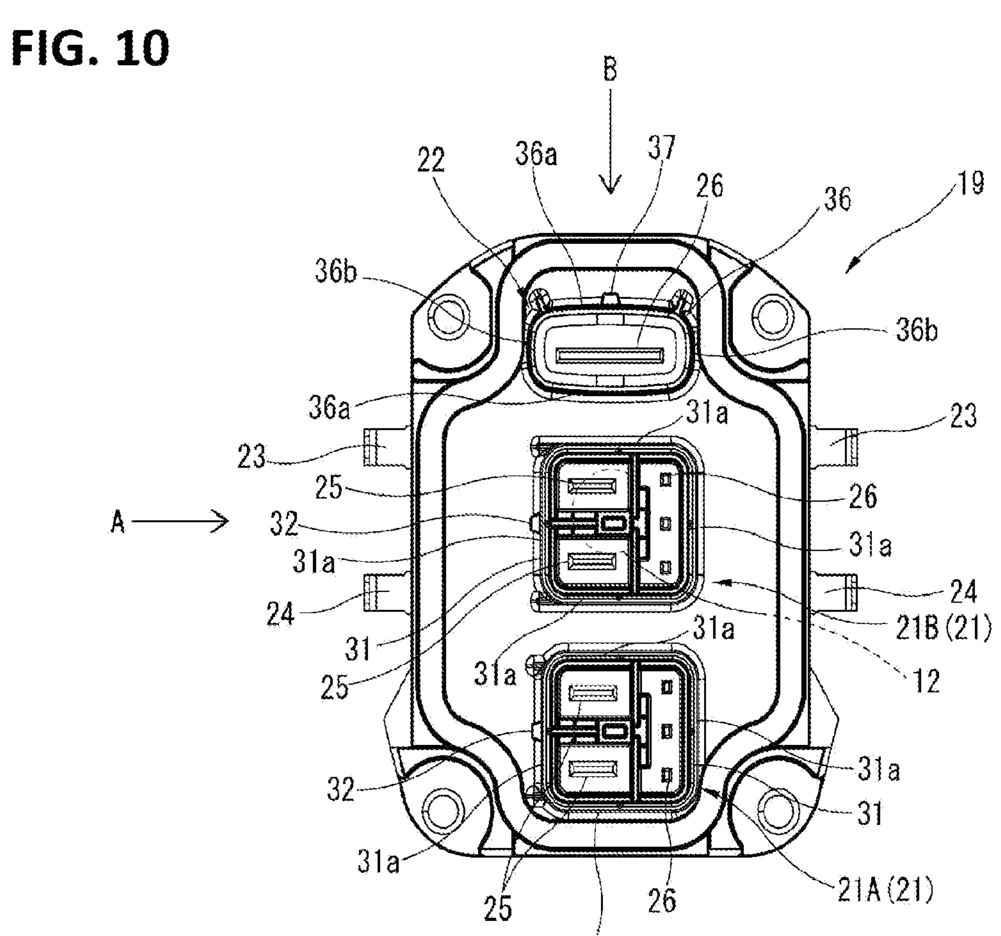
FIG. 10 is a plane view of the connector terminal assembly of a second embodiment.
Figure 11:
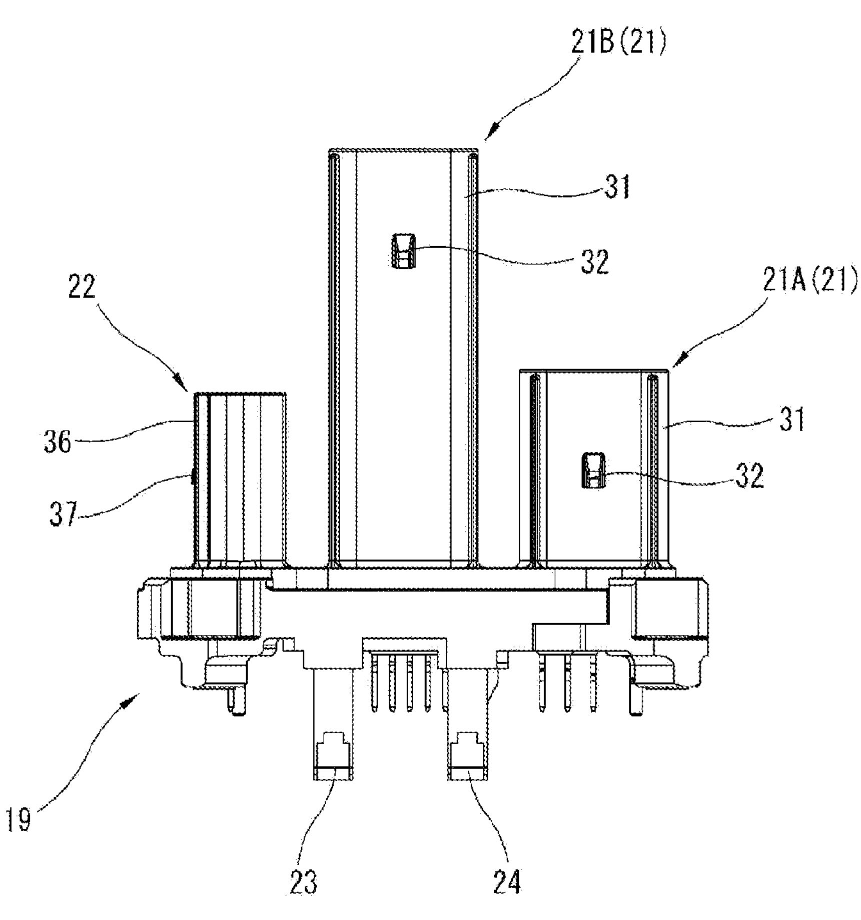
FIG. 11 is a front view of the connector terminal assembly of the second embodiment.
Figure 12:
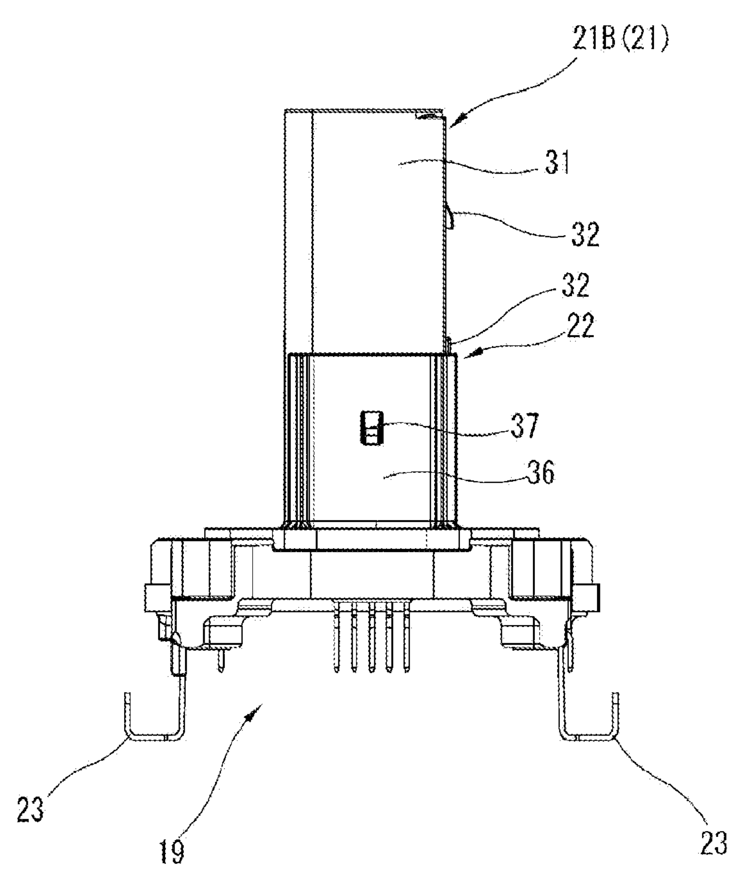
FIG. 12 is a side view of the connector terminal assembly of the second embodiment.
Figure 13:
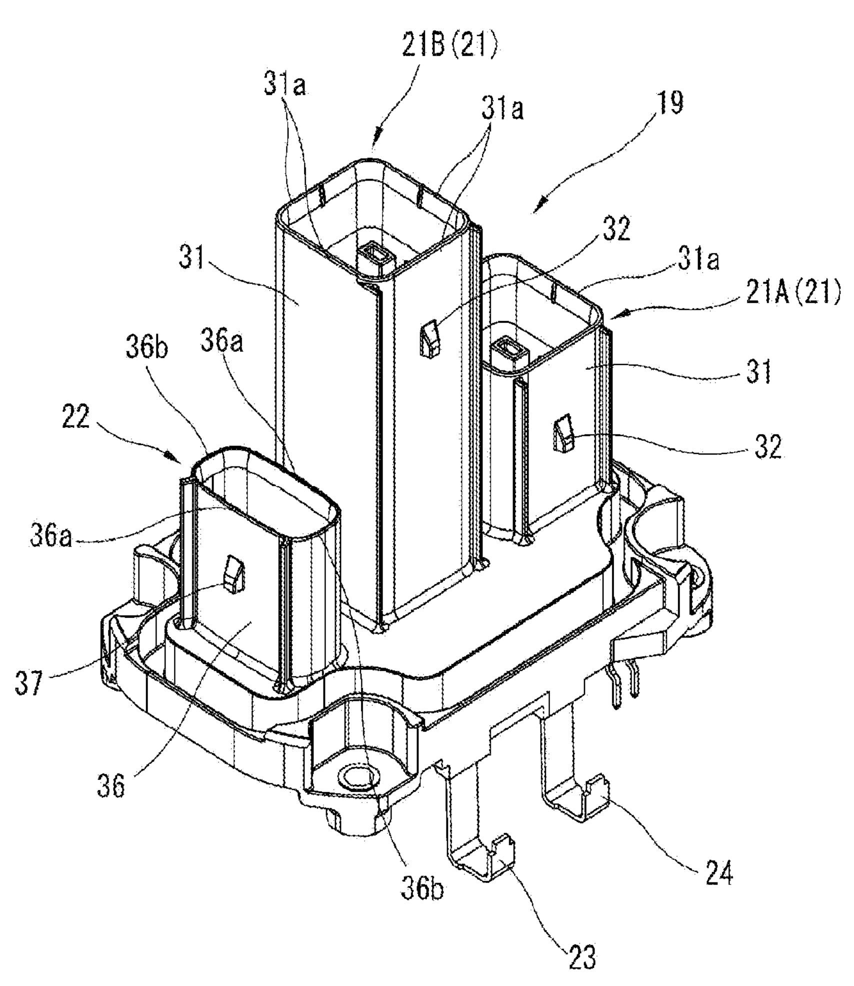
FIG. 13 is a perspective view of the connector terminal assembly of the second embodiment.
Figure 15:
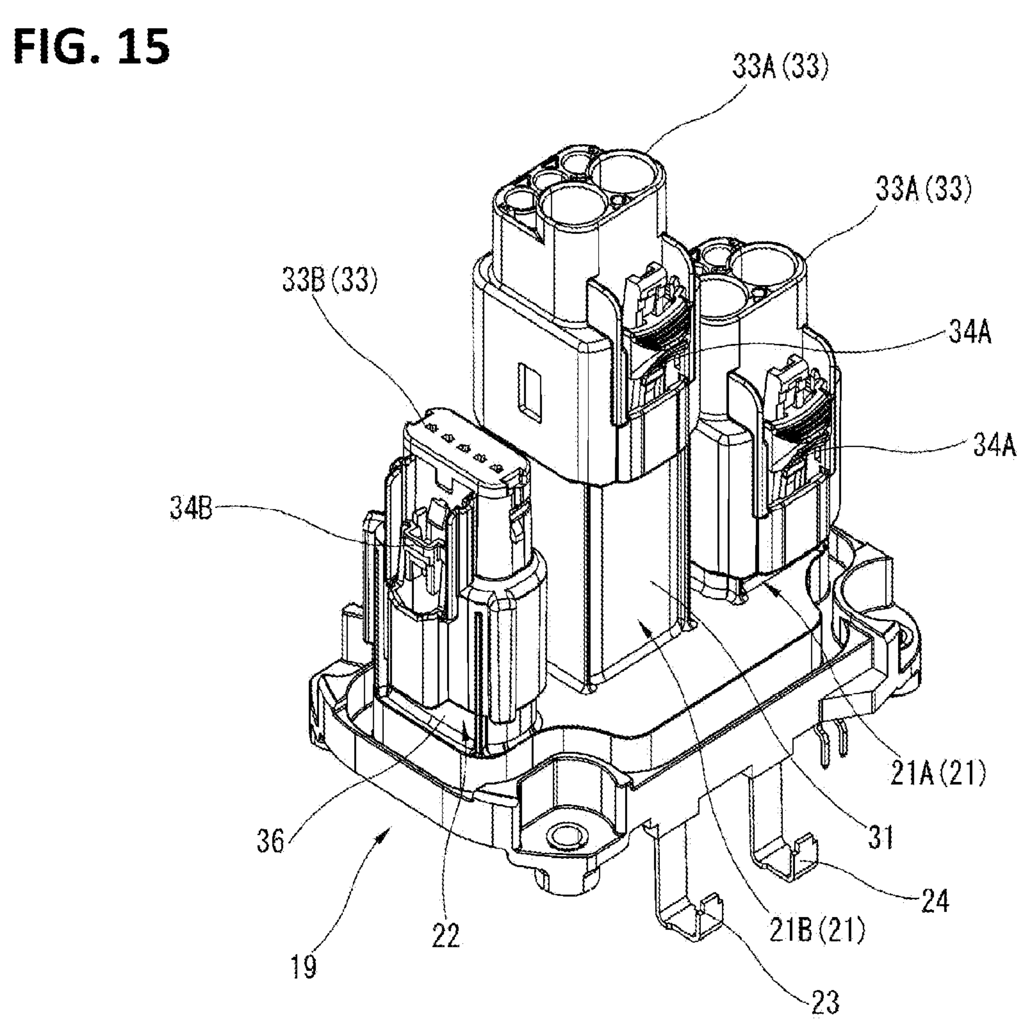
FIG. 15 is a perspective view of the connector terminal assembly of the second embodiment to which external terminals are attached.
Figure 16:
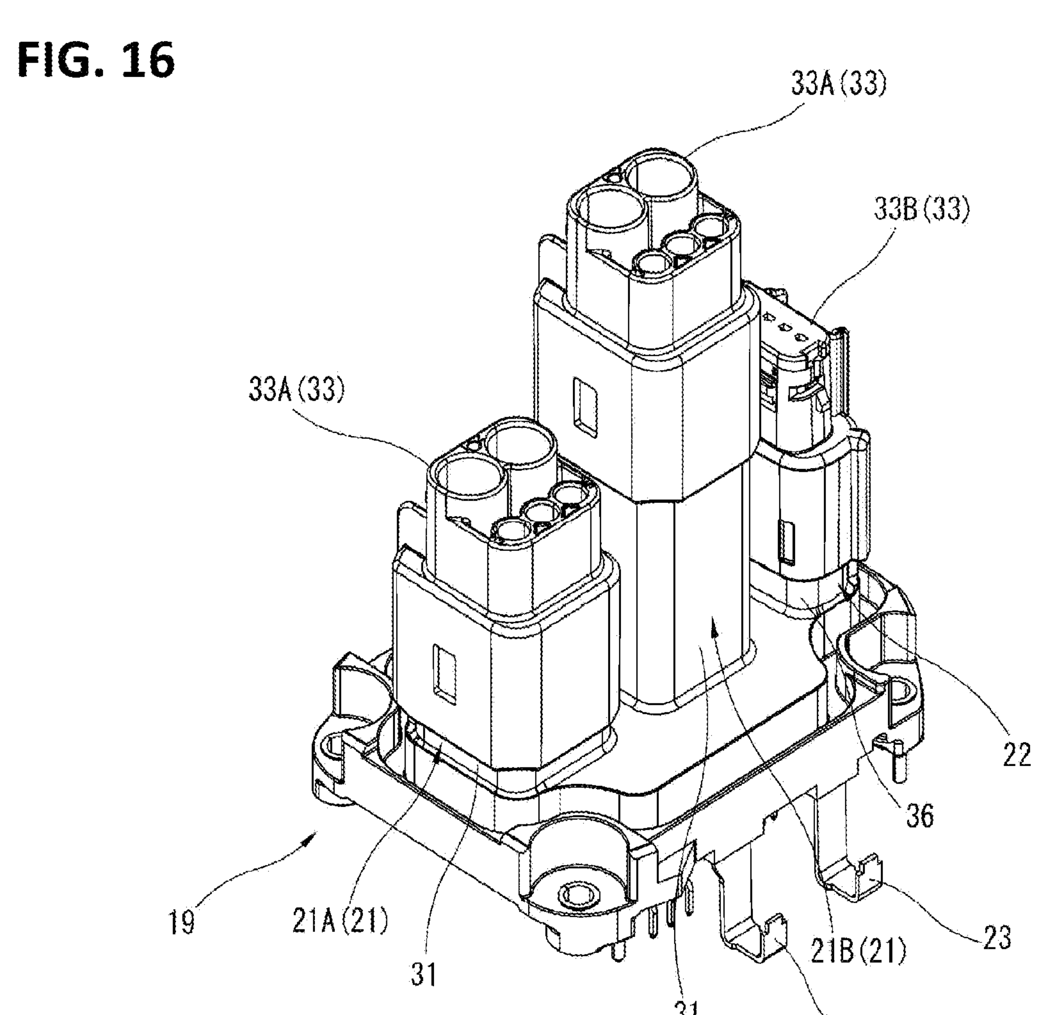
FIG. 16 is a perspective view of the connector terminal assembly of the second embodiment to which external terminals are attached.

The connector terminal assembly 19 of the second embodiment will be explained in detail by referencing FIG. 10 to FIG. 16. FIG. 10 is a plane view of the connector terminal assembly 19 of the second embodiment. FIG. 11 is a front view of the connector terminal assembly 19 of the second embodiment, and there is shown the connector terminal assembly 19 viewed in the direction shown by an arrow A of FIG. 10. FIG. 12 is a side view of the connector terminal assembly 19 of the second embodiment, and there is shown the connector terminal assembly 19 viewed in the direction shown by an arrow B of FIG. 10. FIG. 13 is a perspective view of the connector terminal assembly 19, as a single body, in the second embodiment. FIG. 14 is a perspective view of the connector terminal assembly 19, as a single body, in the second embodiment. FIG. 15 is a perspective view of the connector terminal assembly 19 of the second embodiment, and there is shown the connector terminal assembly 19 to which external terminals 33 are attached. FIG. 16 is a perspective view of the connector terminal assembly 19 of the second embodiment, and there is shown the connector terminal assembly 19 to which external terminals 33 are attached.

As shown in FIG. 10 to FIG. 14, the first connector head 21 includes a first connector head wall 31 as a connector head wall formed so as to surround the periphery of power source terminals 25 and signal terminals 26, and a first coupling part 32 as a coupling part which restricts the separation from the after-mentioned external terminal 33.

The first connector head 21 is formed to have a substantially square outer shape, in the plane view of the connector terminal assembly 19.

The first connector head wall 31 has four side portions 31*a*.

The first coupling part 32 is a projection which has a substantially rectangular outer shape, and protrudes from the outer peripheral surface of one of the side portions 31*a* of the first connector head wall 31. Specifically, the first coupling part 32 is provided at a part of the first connector head 21 which faces the outer peripheral edge side of the connector terminal assembly 19.

In addition, the first coupling part 32 may be provided at a side portion 31*a* which does not face the adjacent connector head.

As shown in FIG. 15 and FIG. 16, the first coupling part 32 is accommodated in and held on a holding portion 34A of the external terminal 33A when the external terminal 33A is attached to the first connector head 21, and regulates the attachment position of the external terminal 33A to the first connector head 21. That is, the external terminal 33A is attached at a predetermined position of the first connector head 21 by the first coupling part 32. The holding portion 34A is provided at the distal end portion of the external terminal 33A.

In addition, the first connector head 21 may be composed of only a power source terminal 25 which is capable of supplying electric power.

As shown in FIG. 10 to FIG. 14, the second connector head 22 includes a second connector head wall 36 as a connector head wall formed so as to surround the periphery of a signal terminal 26, and a second coupling part 37 as a coupling part which restricts the separation from the external terminal 33.

The second connector head 22 is formed to have a substantially rectangular outer shape which is narrow and long along the arrangement direction of the signal terminal 26, in the plane view of the connector terminal assembly 19.

The second connector head wall 36 includes a pair of wide-width side portions 36*a* along the arrangement direction of the signal terminal 26, and a pair of narrow-width side portions 36*b* connected to the pair of the wide-width side portions 36*a*.

The second coupling part 37 is a projection which has a substantially rectangular outer shape, and protrudes from the outer peripheral surface of one of the wide-width side portions 36*a* of the second connector head wall 36. Specifically, the second coupling part 37 is provided at a part of the second connector head 22 which faces the outer peripheral edge side of the connector terminal assembly 19. In addition, the second coupling part 37 may be provided at a narrow-width side portion 36*b* of the second connector head wall 36.

As shown in FIG. 15 and FIG. 16, the second coupling part 37 is accommodated in and held on a holding portion 34B of the external terminal 33B when the external terminal 33B is attached to the second connector head 22, and regulates the attachment position of the external terminal 33B to the second connector head 22. That is, the external terminal 33B is attached at a predetermined position of the second connector head 22 by the second coupling part 37. The holding portion 34B is provided at the distal end portion of the external terminal 33B.

Then, one first connector head 21A of the two first connector heads 21 and the second connector head 22 face each other, in the plane view of the connector terminal assembly 19, with the axial line of the output shaft 12, which is the axial line of the motor rotation shaft of the electric motor, therebetween without being offset from each other. That is, the first connector head 21A makes a pair with the second connector head 22, so as to form a pair of connector heads, with the axial line of the output shaft 12, which is the axial line of the motor rotation shaft of the electric motor, therebetween.

In addition, the other first connector head 21B of the two first connector heads 21 is positioned between the first connector head 21A and the second connector head 22, in the plane view of the connector terminal assembly 19. That is, the first connector head 21B is arranged so as to face the first connector head 21A and the second connector head 22. Specifically, the first connector head 21B is arranged such that two different side portions (surfaces) 31*a* face a side portion 31*a* of the first connector head 21A and a wide-width side portion 36*a* of the second connector head 22. In other words, the first connector head 21A is arranged (formed) so as to face one side of the first connector head 21B, in the plane view of the connector terminal assembly 19. In addition, the second connector head 22 is arranged (formed) so as to face one side of the first connector head 21B, in the plane view of the connector terminal assembly 19.

With this, in the electric power steering device 8 of the second embodiment, the distance between the first connector heads 21 and the second connector head 22 (distance between connector heads) can be reduced, thereby reducing the size.

In addition, as shown in FIG. 10 and FIG. 13, two first connector heads 21 adjacent to each other are formed such that the positions of the first coupling parts 32 along the axial line direction of the output shaft 12 are different from each other. In other words, two first connector heads 21 having the same function of a plurality of connector heads are formed such that the positions of the first coupling parts 32 are different from each other along the axial line direction of the output shaft 12 which is the axial line of the motor rotation shaft of the electric motor.

With this, in the electric power steering device 8 of the second embodiment, the connector heads can be arranged such that the distance between the first connector heads 21 and the second connector heads 22 (distance between connector heads) is reduced without impairing workability at the time the inserting and removing of the external terminals 33, thereby reducing the size.

As the above, although specific embodiments of the present invention have been explained, the present invention is not limited to the above embodiments, and various changes can be performed without departing from the scope and spirit of the present invention.

Figure 17:
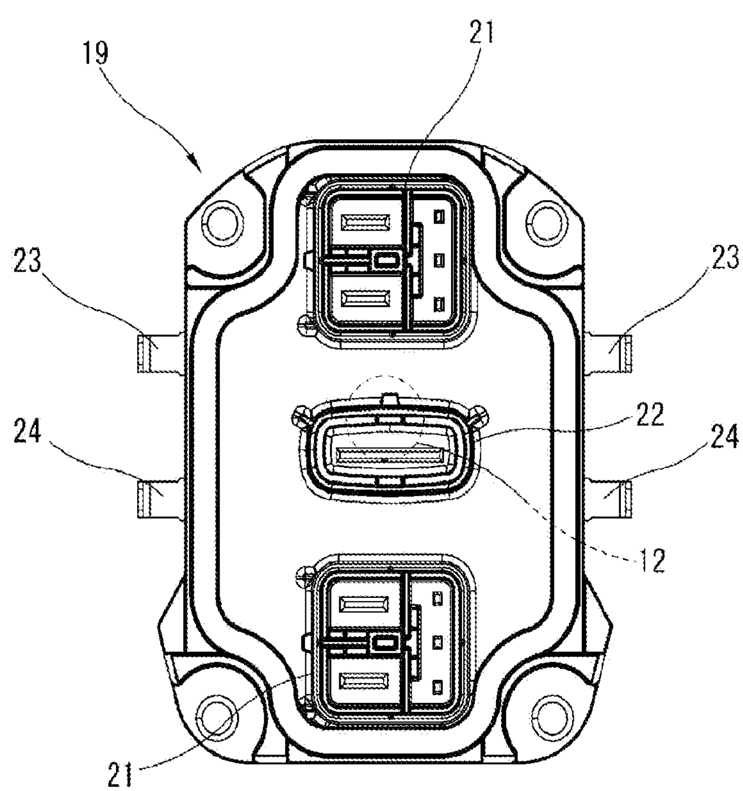
FIG. 17 is a plane view of the connector terminal assembly of another embodiment.

In case where the connector terminal assembly 19 includes two first connector heads 21 and one second connector head 22, as shown, for example, in FIG. 17, the connector terminal assembly 19 may be one in which, in the plane view of the connector terminal assembly 19, the two first connector heads 21 face each other without being offset from each other with the axial line of the output shaft 12 therebetween, and, in the plane view of the connector terminal assembly 19, the second connector head 22 is positioned between the pair of the first connector heads 21.

Figure 18:
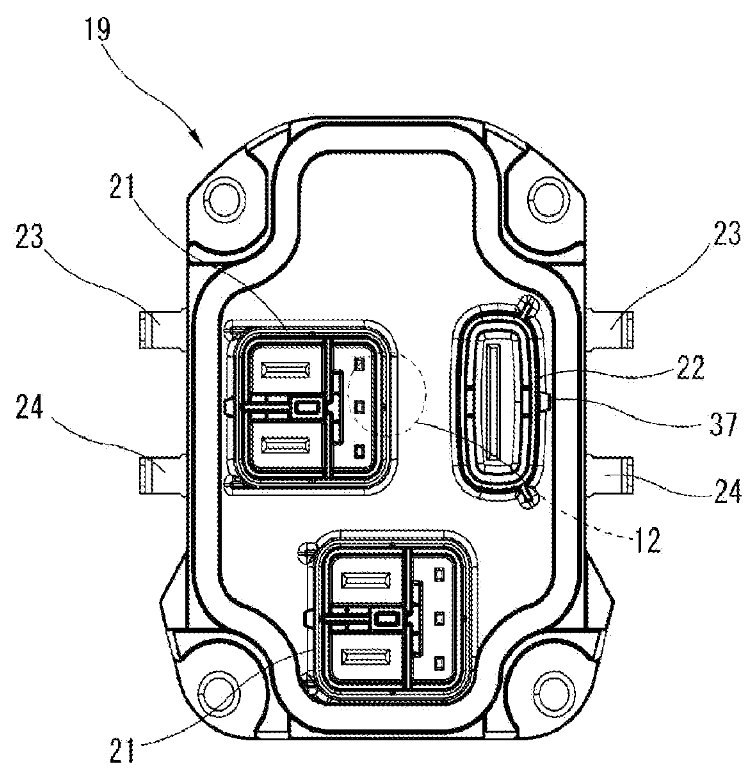
FIG. 18 is a plane view of the connector terminal assembly of another embodiment.

In case where the connector terminal assembly 19 includes two first connector heads 21 and one second connector head 22, as shown, for example, in FIG. 18, the connector terminal assembly 19 may be one in which, in the plane view of the connector terminal assembly 19, the two first connector heads 21 face each other so as to be offset from each other with the axial line of the output shaft 12 therebetween, one wide-width side portion 36*a* of the second connector head 22 faces one first connector head 21, and one narrow-width side portion 36*b* of the second connector head 22 faces the other first connector head 21.

Figure 19:
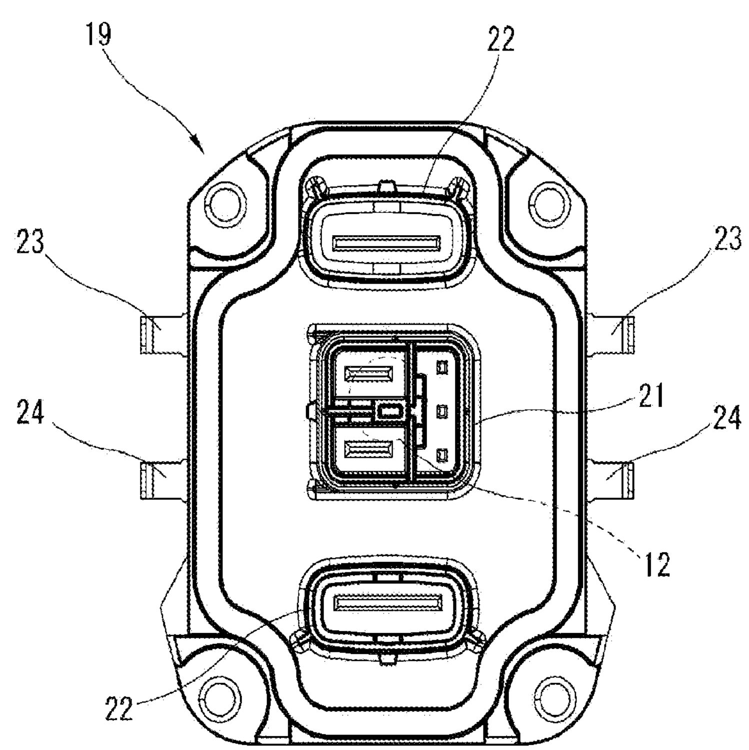
FIG. 19 is a plane view of the connector terminal assembly of another embodiment.

In addition, for example, the connector terminal assembly 19 may include one first connector head 21 and two second connector heads 22. In this case, as shown, for example, in FIG. 19, the connector terminal assembly 19 may be one in which, in the plane view of the connector terminal assembly 19, the two second connector heads 22 face each other without being offset from each other with the axial line of the output shaft 12 therebetween, and, in the plane view of the connector terminal assembly 19, the first connector head 21 is positioned between the pair of the second connector heads 22.

Figure 20:
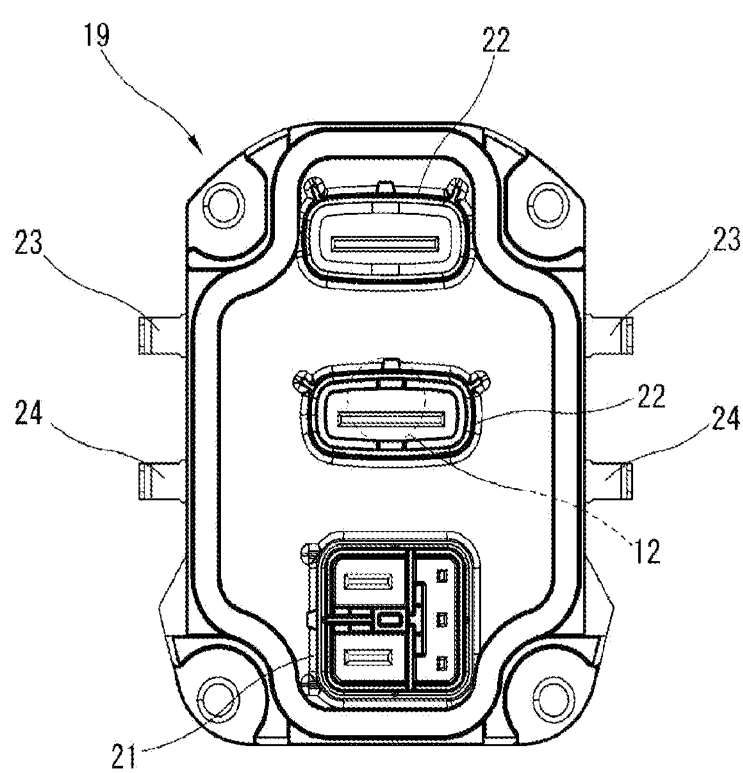
FIG. 20 is a plane view of the connector terminal assembly of another embodiment.

In addition, in case where the connector terminal assembly 19 includes one first connector head 21 and two second connector heads 22, as shown, for example, in FIG. 20, the connector terminal assembly 19 may be one in which, in the plane view of the connector terminal assembly 19, one second connector heads 22 and the first connector head 21 face each other without being offset from each other with the axial line of the output shaft 12 therebetween, and the other second connector head 22 is positioned between the first connector head 21 and the one second connector head 22.

In addition, in case where there are provided a plurality of first connector heads 21, the connector terminal assembly 19 may be configured such that the positions of all of the first coupling parts 32 along the axial line direction of the output shaft 12 are different from each other.

In addition, in case where there are provided a plurality of second connector heads 22, the connector terminal assembly 19 may be configured such that the positions of all of the second coupling parts 37 along the axial line direction of the output shaft 12 are different from each other.

In addition, the connector terminal assembly 19 may be configured such that the positions of all of the first coupling parts 32 of the first connector heads 21 and the positions of all of the second coupling parts 37 of the second connector heads 22 are different from each other along the axial line direction of the output shaft 12.

As an electric power steering device 8 (electric motor drive control device) based on each of the above embodiments, for example, the following modes can be considered.

(1) An electric motor drive control device includes: an electric motor having a plurality of independent windings; an electronic control unit configured to control driving of the electric motor; a plurality of first connector heads to which external terminals are attached; and at least one second connector head which has a function different from those of the first connector heads, and to which an external terminal is attached, wherein one of the first connector heads forms a pair of connector heads with another first connector head or with the second connector head, the pair of the connector heads facing each other with an axial line of a motor rotation shaft of the electric motor therebetween, and wherein one of the first connector heads or the second connector head positioned between the pair of the connector heads is arranged so as to face the pair of the connector heads.

With this, the first connector heads and the second connector head can be arranged while reducing the distance between the connector heads, thereby reducing the size of the electric motor drive control device.

(2) In the electric motor drive control device, the first connector heads and the second connector head each have a rectangular outer shape in cross section, and the first connector head or the second connector head positioned between the pair of the connector heads is arranged such that different surfaces thereof face the respective pair of the connector heads.

(3) In the electric motor drive control device, each of the first connector heads is a connector head capable of supplying electric power, and the second connector head is a connector head for signal transmission.

(4) The electric motor drive control device includes two first connector heads and one second connector head, wherein the two first connector heads form a pair of connector heads and face each other with the axial line of the motor rotation shaft therebetween, and wherein the one second connector head is arranged between the two first connector heads.

(5) In the electric motor drive control device, two first connector heads form a pair of connector heads and face each other so as to be offset from each other with the axial line of the motor rotation shaft therebetween, one second connector head has a pair of wide-width side portions along the arrangement direction of a signal terminal and a pair of narrow-width side portions connected to the pair of the wide-width side portions, one wide-width side portion of the second connector head faces one first connector head, and one narrow-width side portion of the second connector head faces the other first connector head.

(6) In the electric motor drive control device, two first connector heads form a pair of connector heads and face each other without being offset from each other with the axial line of the motor rotation shaft therebetween, and one second connector head is arranged between the two first connector heads.

(7) The electric motor drive control device includes two first connector heads and one second connector head, wherein one first connector head of the two first connector heads and the second connector head form a pair of connector heads and face each other with the axial line of the motor rotation shaft therebetween, and wherein the other first connector head of the two first connector heads is arranged between the pair of the connector heads.

(8) An electric motor drive control device includes: an electric motor having a plurality of independent windings; an electronic control unit configured to control driving of the electric motor; at least four connector heads to which external terminals are attached; a first connector head group which is a group of a pair of the connector heads which face each other with an axial line of a motor rotation shaft of the electric motor therebetween; and a second connector head group which is a group of the connector heads which are different from those of the first connector head group and face each other with the axial line of the motor rotation shaft of the electric motor therebetween, and wherein the connector heads of the second connector head group are arranged such that at least a part of each of them faces at least one of the connector heads of the first connector head group.

With this, the first connector heads and the second connector heads can be arranged while reducing the distance between the connector heads, thereby reducing the size of the electric motor drive control device.

(9) In the electric motor drive control device, the connector heads each are either of a first connector head capable of supplying electric power and a second connector head for signal transmission, and the connector heads of each of the first connector head group and the second connector head group are formed by any of a combination of the first connector head and the second connector head, a combination of only the first connector heads and a combination of only the second connector heads.

(10) An electric motor drive control device includes: an electric motor having a plurality of independent windings; an electronic control unit having a drive control system in each of the windings of the electric motor and configured to control the driving of the electric motor; and a plurality of connector heads to which external terminals are attached, wherein each of the connector heads includes: at least one of a power source terminal and a signal terminal; a connector head wall formed so as to surround the periphery of the terminals; and a coupling part formed on the connector head wall so as to protrude therefrom, so as to restrict the separation from a corresponding one of the external terminals, and wherein the positions of the coupling parts of at least two connector heads of the plurality of the connector heads which have the same function are different from each other along the axial line direction of the rotation shaft of the electric motor.

With this, the connector heads can be arranged while reducing the distance therebetween without impairing workability at the time the inserting and removing of the external terminals, thereby reducing the size of the electric motor drive control device.

(11) In the electric motor drive control device, each of the first connector head and the second connector head has a coupling part which restricts separation from a corresponding one of the external terminals, and positions of the respective coupling parts of a plurality of the first connector heads along an axial line direction of the rotation shaft of the electric motor are different from each other.

(12) In the electric motor drive control device, each of the first connector head and the second connector head has a coupling part which restricts separation from a corresponding one of the external terminals, and positions of the respective coupling parts of a plurality of the first connector heads along an axial line direction of the rotation shaft of the electric motor are different from each other.

(13) In the electric motor drive control device, a terminal capable of supplying electric power and a terminal for signal transmission are integrated into each of the first connector heads.

(14) In the electric motor drive control device, as each of the connector heads, one in which a terminal capable of supplying electric power and a terminal for signal transmission are integrated is included.

(15) The electric motor drive control device includes a connector head member provided with the first connector heads and the second connector head, wherein the first connector heads and the second connector head each include a coupling part which restricts separation from a corresponding one of the external terminals, and wherein the coupling part is provided at a part of each of the first connector heads or a part of the second connector head, the part facing an outer peripheral edge side of the connector head member.

The invention claimed is:

1. An electric motor drive control device comprising:

an electric motor having a plurality of independent windings;

an electronic control unit configured to control driving of the electric motor;

a plurality of first connector heads to which external terminals are attached; and at least one second connector head which has a function different from those of the first connector heads, and to which an external terminal is attached, wherein one of the plurality of first connector heads forms a first pair of connector heads with another of the plurality of first connector heads or with the second connector head, the first pair of the connector heads facing each other with an axial line of a motor rotation shaft of the electric motor therebetween, wherein one of the plurality of first connector heads or the second connector head forms a second pair of the connector heads with another of the plurality of first connector heads or the second connector head, both connector heads of the second pair of the connector heads positioned between the first pair of the connector heads so as to face each other with the axial line of the motor rotation shaft of the electric motor therebetween, wherein a terminal of at least one of the second pair of the connector heads positioned between the first pair of the connector heads is arranged at a position facing the first pair of the connector heads, wherein each of the first connector heads has at least one first terminal capable of supplying electric power and a plurality of second terminals for signal transmission, and the second connector head has a third terminal for signal transmission, wherein the plurality of second terminals for signal transmission of the first connector head of the second pair of connector heads positioned between the first pair of connector heads are arranged in a straight line, wherein a longitudinal direction of the at least one first terminal capable of supplying electric power of the first connector head of the first pair of connector heads is orthogonal to the straight line, and wherein the terminal capable of supplying electric power of the first connector head of the first pair of the connector heads is arranged on an extension of the straight line.

2. The electric motor drive control device according to claim 1, wherein the plurality of first connector heads and the second connector head each have a rectangular outer shape in cross section, and wherein the plurality of first connector heads or the second connector head positioned between the pair of the connector heads is arranged such that different surfaces thereof face the respective pair of the connector heads.

3. The electric motor drive control device according to claim 1, wherein each of the plurality of first connector heads is a connector head capable of supplying electric power, and the second connector head is a connector head for signal transmission.

4. The electric motor drive control device according to claim 1, wherein the first connector heads each include a coupling part which restricts separation from a corresponding one of the external terminals, and positions of the respective coupling parts of the first connector heads along an axial line direction of the motor rotation shaft of the electric motor are different from each other.

5. The electric motor drive control device according to claim 1, wherein a terminal capable of supplying electric power and a terminal for signal transmission are integrated into each of the first connector heads.

6. The electric motor drive control device according to claim 1, comprising a connector head member provided with the first connector heads and the second connector head, wherein the first connector heads and the second connector head each include a coupling part which restricts separation from a corresponding one of the external terminals, and wherein the coupling part is provided at a part of each of the first connector heads or a part of the second connector head, the part facing an outer peripheral edge side of the connector head member.

7. An electric motor drive control device comprising:

an electric motor having a plurality of independent windings;

an electronic control unit configured to control driving of the electric motor;

at least four connector heads to which external terminals are attached;

a first connector head group which is a group of a pair of the connector heads which face each other with an axial line of a motor rotation shaft of the electric motor therebetween; and a second connector head group which is a group of the connector heads which are different from those of the first connector head group and face each other with the axial line of the motor rotation shaft of the electric motor therebetween, wherein the connector heads of the second connector head group are arranged such that at least a part of each of them faces at least one of the connector heads of the first connector head group, wherein each of the connector heads of the second connector head group is positioned between the first connector head group, wherein a terminal of at least one of the connector heads of the second connector head group positioned between the first connector head group is arranged at a position facing the connector heads of the first connector head group, wherein one of the connector heads of the first connector head group has at least one first terminal capable of supplying electric power and a plurality of second terminals for signal transmission, and one of the connector heads of the second connector head group has at least one third terminal capable of supplying electric power and a plurality of fourth terminals for signal transmission, wherein the plurality of fourth terminals for signal transmission of the connector heads of the second connector head group positioned between the first connector head group are arranged in a straight line, wherein a longitudinal direction of the at least one first terminal capable of supplying electric power of the one of the connector heads of the first connector head group is orthogonal to the straight line, and wherein the first terminal capable of supplying electric power of the one of the connector heads of the first connector head group is arranged on an extension of the straight line.

8. The electric motor drive control device according to claim 7, wherein the connector heads of each of the first connector head group and the second connector head group are formed by any of a combination of the first connector head and the second connector head, a combination of only the first connector heads and a combination of only the second connector heads.

9. The electric motor drive control device according to claim 8, wherein each of the first connector head and the second connector head has a coupling part which restricts separation from a corresponding one of the external terminals, and positions of the respective coupling parts of a plurality of the first connector heads along an axial line direction of the rotation shaft of the electric motor are different from each other.

10. The electric motor drive control device according to claim 8, comprising a connector head member provided with the first connector head and the second connector head, wherein the first connector head and the second connector head each include a coupling part which restricts separation from a corresponding one of the external terminals, and wherein the coupling part is provided at a part of each of the first connector head or a part of the second connector head, the part facing an outer peripheral edge side of the connector head member.

11. An electric motor drive control device comprising:

an electric motor having a plurality of independent windings;

an electronic control unit configured to control driving of the electric motor; and a plurality of connector heads to which external terminals are attached, wherein each of the connector heads includes a coupling part which restricts separation from a corresponding one of the external terminals, wherein positions of the respective coupling parts of the connector heads are different from each other along an axial line direction of a rotation shaft of the electric motor, wherein the plurality of the connector heads forms two pairs of the connector heads, wherein a first pair of the connector heads faces each other with the axial line of the motor rotation shaft of the electric motor therebetween, and each connector head of a second pair of the connector heads is positioned between the first pair of the connector heads so as to face each other with the axial line of the motor rotation shaft of the electric motor therebetween, wherein a terminal of the second pair of the connector heads positioned between the first pair of connector heads is arranged at a position facing the first pair of the connector heads, wherein one of the first pair of the connector heads has at least one first terminal capable of supplying electric power and a plurality of second terminals for signal transmission, and one of the second pair of the connector heads has at least one third terminal capable of supplying electric power and a plurality of fourth terminals for signal transmission, wherein the plurality of fourth terminals for signal transmission of the one of the second pair of the connector heads positioned between the first pair of the connector heads are arranged in a straight line, wherein a longitudinal direction of the at least one first terminal capable of supplying electric power of the one of the first pair of connector heads is orthogonal to the straight line, and wherein the at least one first terminal capable of supplying electric power of the one of the first pair of connector heads is arranged on an extension of the straight line.

12. The electric motor drive control device according to claim 11, wherein as each of the connector heads, one in which a terminal capable of supplying electric power and a terminal for signal transmission are integrated is included.

* * * * *